Nov. 6, 1934.     J. W. HARDING     1,979,878
CONVEYING MECHANISM
Filed March 10, 1931     5 Sheets-Sheet 4

INVENTOR
John W. Harding
By Green & McCallister
His Attorneys

Patented Nov. 6, 1934

1,979,878

UNITED STATES PATENT OFFICE 1,979,878

CONVEYING MECHANISM

John W. Harding, Brockway, Pa., assignor, by mesne assignments, to Ball Brothers Company, Muncie, Ind., a corporation of Indiana Application March 10, 1931, Serial No. 521,471

23 Claims. (Cl. 198—31)

This invention relates to conveyors and particularly to leer packing conveying machines.

An object of this invention is to provide a machine of the class described which is particularly adapted for delivering hot ware, such as blown or pressed glass articles, into a leer or to another destination and which is simpler in construction and more effective in operation than other similar machines known to me.

A further object is to produce such a machine which is so arranged and constructed that the articles handled are not damaged or marred during the operation of transferring them from the forming machine to the leer or other destination.

These and other objects, which will be made more apparent throughout the further description of the invention, are accomplished by means of a machine embodying the features herein described and illustrated.

In the drawings accompanying and forming a part hereof Fig. 2 is a fragmental plan view of the apparatus shown in Fig. 1.

The machine illustrated in the drawings includes a conveyor belt 10 which is arranged to convey articles from a forming machine to a transfer trough 11. The transfer trough is adapted to swing from the position shown in Fig. 2 across a stationary plate 13, and to deliver the articles onto a second conveyor 12 which extends at an angle to the first conveyor and which may traverse a path immediately in front of the inlet to the leer or other destination. The articles so delivered to the conveyors 12 are assembled on the conveyor by the cooperation of a barrier 13', a pusher 14 and a so called stabilizer 47 (Fig. 6) and are then moved off of the conveyor 12 and into the leer or other destination by means of the ram or pusher 14. As shown, the barrier is carried by the pusher and the pusher operates periodically and in timed relation with the trough 11. As hereinafter pointed out, the machine including these general features is so arranged that its various operations are synchronized so as to effectively accomplish the intended purpose and prevent damage or injury to the articles conveyed.

Figure 1:
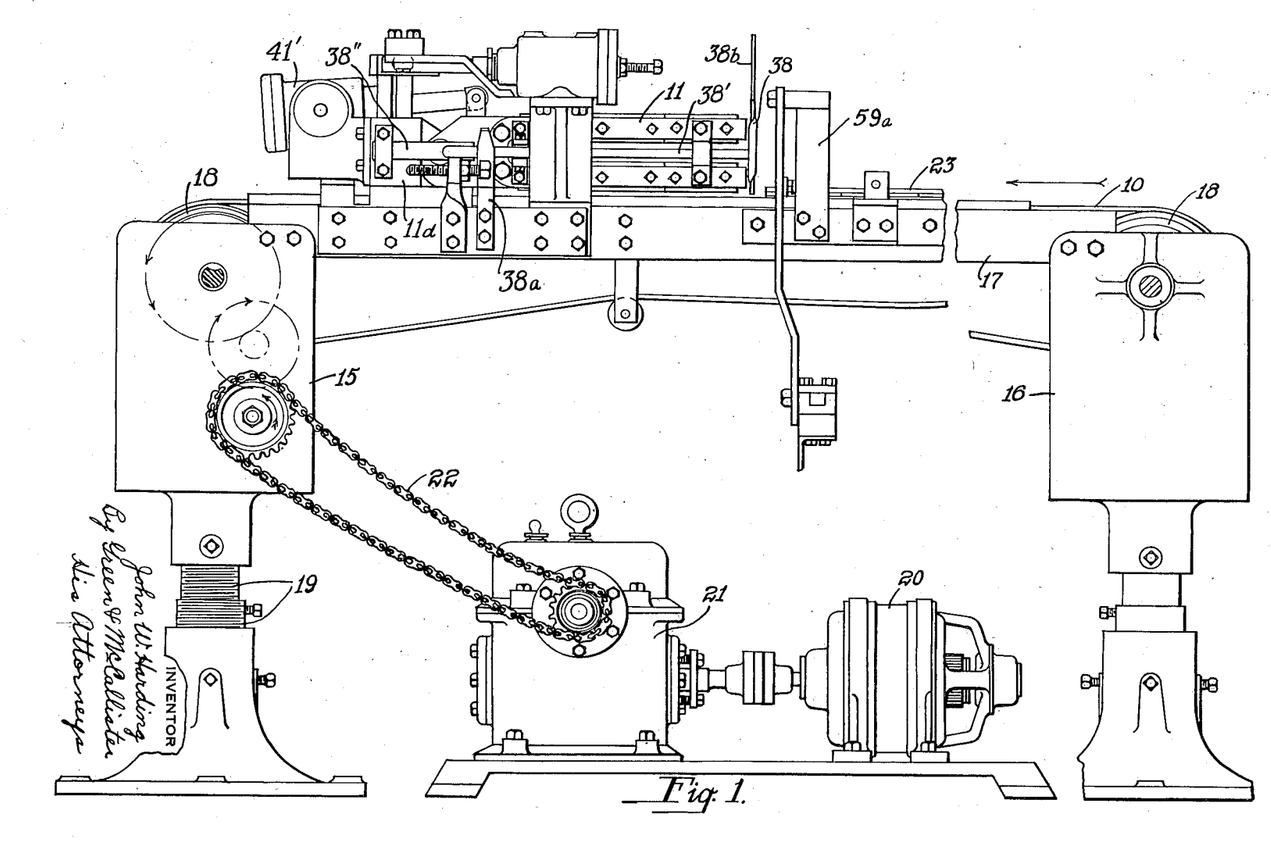
Figure 1 is a side elevation of a machine embodying my invention.

Referring to Figs. 1 and 2, the base frame of the machine may be of any desired form, but as illustrated, consists essentially of two adjustable standards 15 and 16, which support a runway 17 for the conveyor 10, shown in the form of a girder supported at its ends by the two standards. The standards enclose guiding pulleys 18 over which the conveyor belt 10 runs and the standard 15 includes a gear train for driving one of these pulleys. The frame also includes a right angle extension which primarily forms a support for the conveyor 12.

Each standard is shown as formed in part by telescoping screw threaded members 19, which may be employed for adjusting the vertical height of the runway 17 carried by the standards. Suitable set screws are employed in connection with these telescopic members for locking them in their adjusted positions. In Fig. 1, I have also illustrated a motor 20 and a reduction gearing 21 for driving the conveyor belt 10. As shown, the conveyor is driven through the agency of sprockets and a sprocket chain 22. It will be apparent that the motor 20 and the gear 21 may also be employed for driving the conveyor 12 and other movable parts of the machine, but for convenience of operation I have shown a separate driving mechanism for the conveyor 12. It will also be understood that any suitable means may be employed for the purpose of varying the speed of the conveyors 10 and 12.

Figure 7:
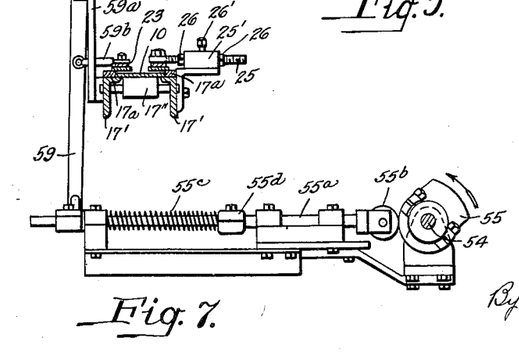
Fig. 7 is a fragmental sectional view along the line 7—7 of Fig. 2.

The runway for the conveyor 10 consists essentially of a built-up girder which extends from one standard to the other and which is provided with supporting rollers for the flexible conveyor belt 10 of substantially the form illustrated in Fig. 7, wherein the runway 17 is shown as formed by spaced angle bars 17' between which the belt-supporting rollers 17'' are located. The belt 10 is guided over these rollers by edge plates 17a which extend longitudinally of the belt. As shown, these edge plates extend somewhat above the upper surface of the belt 10, and therefore form guides for the articles conveyed by the belt. Converging guides 23 and 23' (Figs. 2 and 3) are also provided at a point along the conveyor 10, for the purpose of insuring the delivery of conveyed articles to the trough 11, and also for the purpose of checking the movement of the articles toward the trough during the period that the trough is out of alignment with the conveyor 10. For this reason the guide 23 is adjustable and each guide is so arranged that it may be swung toward and away from the other.

Figures 3, 4:
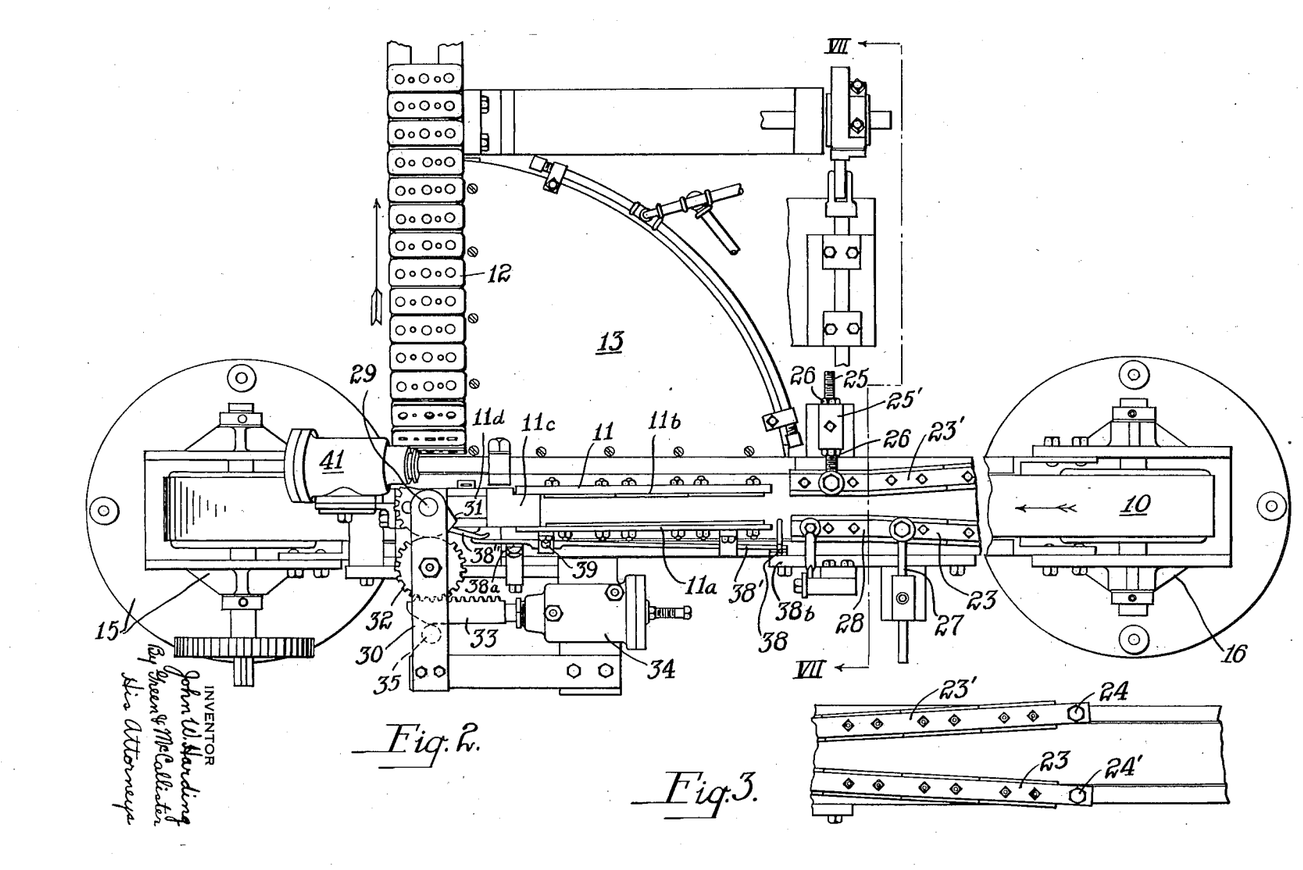
Fig. 3 is a fragmental plan view supplementing Fig. 2.
Fig. 4 is a plan view of the machine illustrated in Figs. 1 and 2, in which certain details of construction shown in Fig. 2 are omitted for the purpose of illustrating other details of construction.
Figure 4:
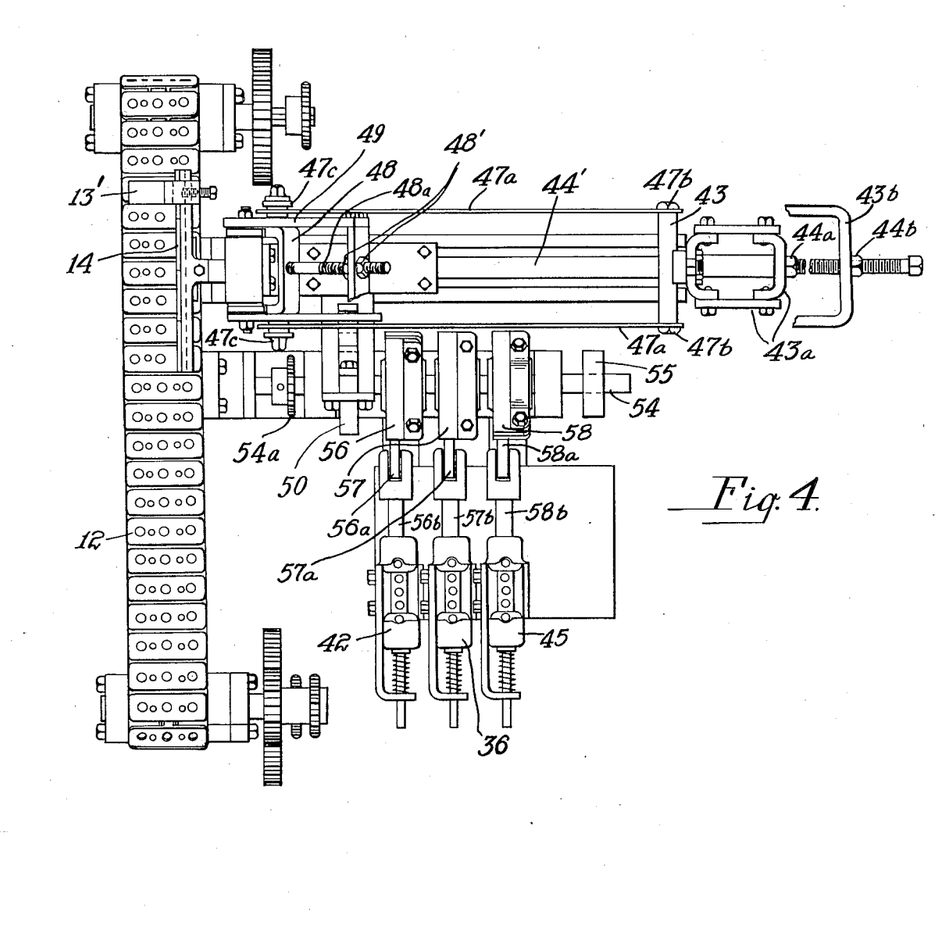

As shown in Figs. 2, 3 and 7, one end of the guide 23' is fulcrumed on a bolt 24 so that its opposite end may be moved to different positions relatively to the center line of the belt 10. Its position with relation to the center line of the belt may be adjusted and secured by means of a screw threaded link 25, which extends through a suitable guiding bracket 25', secured to the way 17. The position of the link with relation to the bracket is varied by means of oppositely disposed nuts 26 and it may be secured in any adjusted position by means of a set screw 26', which extends through the bracket and engages the shank of the link.

The guide 23 is similarly fulcrumed on a bolt 24', but it is so arranged that it is periodically swung toward and away from the guide 23'. The purpose of this is to form a periodically effective barrier for articles moving with the belt 10 and to check their movement during the periods that the trough 11 is out of alignment with the belt 10. The operating mechanism for the guide 23 is illustrated in Fig. 7 and its operation will be later described.

Figure 8:
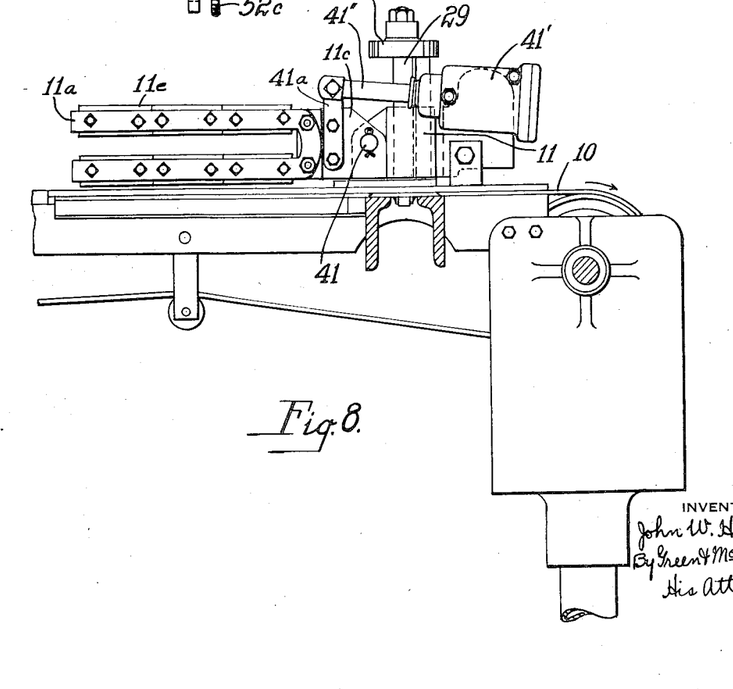
Fig. 8 is a fragmental side elevation of the apparatus shown in Fig. 2.

As illustrated in Figs. 1, 2 and 8, the trough 11 is in effect a swinging arm made up of horizontally spaced guides 11a and 11b, which are rigidly secured to a support 11c. This support is shown as pivotally secured to a standard 11d by means of a clevis bolt 41 so that it is capable of vertical, pivotal motion with relation to the standard. Each way 11a—11b is formed in two parts spaced vertically with relation to each other. The inner face of these spaced members are lined with a non-combustible material such as asbestos board 11e and the height of the sides of the trough formed by these ways is such as to prevent articles, such as bottles, from toppling during the swinging movement of the trough 11. The standard 11d is provided with a pivot pin 29, which guides the horizontal swing of the trough and is suitably journalled in the frame of the machine.

A gear sector 31 is mounted on the pin 29 and meshes with a pinion 32, which in turn meshes with a rack 33. The rack is actuated by a piston and cylinder 34 and is guided in its movements by a roller 35 secured to plate 30 which in effect constitutes a part of the frame of the machine. The cylinder and its piston are preferably pneumatically operated and the cylinder receives compressed air from any suitable source through a cam actuated control valve 36, shown in Figs. 4 and 6. All piping for compressed air is omitted for the sake of simplicity. The rack 33 is periodically reciprocated under the control of the valve 36 and therefore operates to swing the trough 11 back and forth from the position illustrated in Fig. 2 to a position at right angles thereto, in which it is located in alignment with the conveyor 12. The trough in swinging from the position illustrated to a position in alignment with the conveyor 12, slides the articles collected by it off of the belt 10 and across the plate 13 on to the conveyor belt 12. The plate 13 is preferably heated to avoid checking and damage of the hot articles coming in contact with it.

In order to prevent articles being thrown from the trough as it swings from the belt 10 to the belt 12, the open end of the trough is provided with a gate 38 which automatically moves to the open position when the trough is in the position shown in Fig. 2, but automatically moves to close the end of the trough as the trough leaves that position. As shown, the gate 38 is mounted on the end of a lever 38' which is fulcrumed at 39 on the side of the trough. The short end of the lever is engaged by a leaf spring 38", which is secured to the rotatable standard 11d, as shown in Fig. 1. The relationship of the spring and lever is such that the spring normally tends to move the gate to the closed position.

The short end of the lever, however, is engaged by a finger 38a mounted on the frame and so arranged that it moves the lever in opposition to the spring pressure as the trough 11 swings to its article receiving position—in alignment with the belt 10. This opens the gate and provides free access into the trough for articles delivered by the ways 23 and 23'.

It will be noted that the pivot pin 29 about which the trough 11 swings, is located in an extension of the center line of the conveyor 12 and for this reason the trough may be swung into alignment with the conveyor 12, and when in that position, locates the articles conveyed by it centrally with relation to the conveyor 12. In order to free the articles so moved on to the conveyor, means are provided for lifting the trough free of those articles or for opening the gate 38. As previously stated, the trough proper is pivotally secured to the standard 11d by means of the clevis pin 41 (Fig. 8). As shown in Fig. 2, this pivotal connection is, in effect, a clevis joint between the trough and the standard.

The trough is swung about the pin 41—in order to lift it out of engagement with articles on the conveyor belt 12—by means of a piston and its cylinder 41', which is secured to the standard 11d. The piston rod 41" is pivotally secured to a bracket 41a secured to the portion 11c of the trough. The operation of the piston and cylinder 41' is controlled by a cam actuated valve 42, the arrangement being such that the trough proper is lifted or tilted upwardly about the clevis pin 41 after the articles are moved by it onto the conveyor 12, and the trough is held in this elevated or tilted position as it moves back to its position of alignment with the belt 10. During this movement the piston and cylinder 41' operate to drop the trough to its lower position shown in Fig. 1, the gate 38 is again opened by the engagement of the lever 38' with the finger 38a.

It should be understood that articles located on the conveyor 12, but confined within the trough 11, may be released so as to move with the conveyor by the opening of the gate 38. I have, therefore, provided an upwardly projecting finger 38b, which is secured to the gate. This finger is adapted to contact with a stop 38c, shown diagrammatically in Fig. 6, and to thereby open the gate as the trough 11 comes into alignment with the conveyor belt 12. With this arrangement the articles confined by the trough will begin to move with the belt 12, immediately the gate is opened—i. e., moves out of the line of travel of the articles then on the conveyor—and by properly timing the speed of the conveyor, the upward tilting movement of the trough may be dispensed with. It will, however, be understood that the gate may be opened as described even where the trough is raised by the cylinder 41, since this arrangement will permit an earlier backward swing of the trough and will, in many cases, avoid the necessity of speeding up the conveyor.

Figure 5:
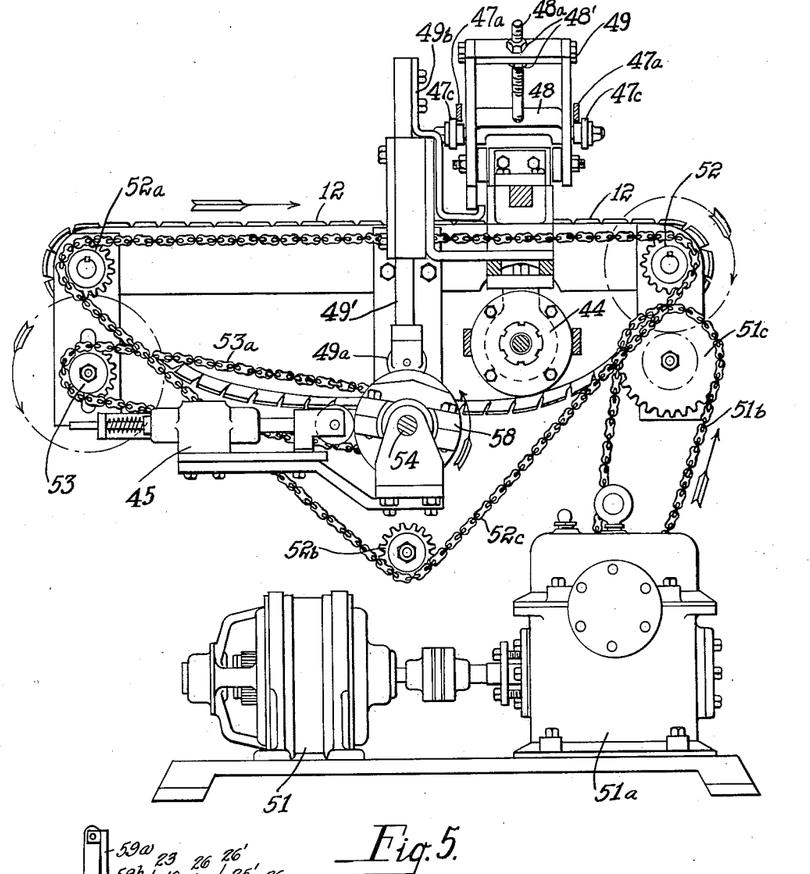
Fig. 5 is an end view of the machine shown in Fig. 4, associated with a motor and a change speed gear.
Figure 6:
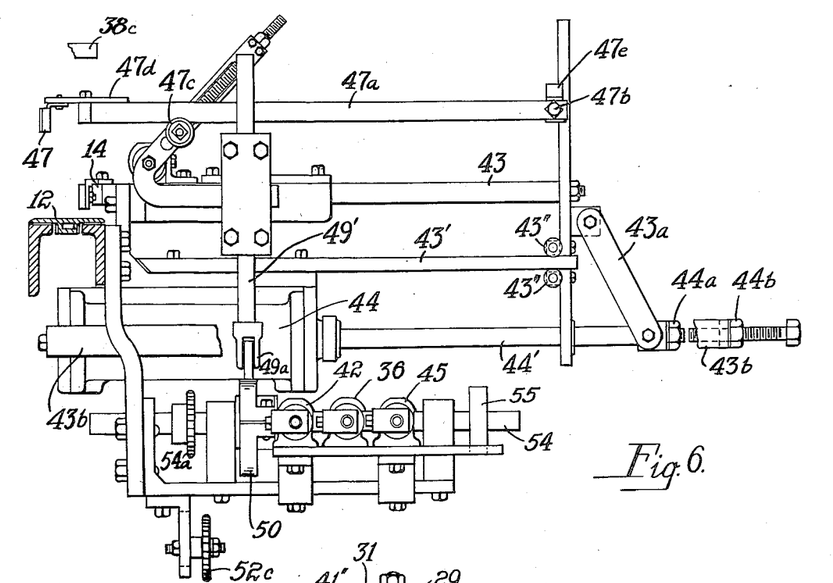
Fig. 6 is a side elevation of a portion of the apparatus shown in Figs. 4 and 5.

The ram or pusher 14, for moving articles from the conveyor 12 into the leer is carried by a movable frame 43, illustrated in Figs. 4, 5 and 6. As shown, the frame is mounted on the extension of the machine frame which forms a guide for the conveyor 12 and is so arranged that it is capable of reciprocation along the guides 43'. Rollers for facilitating this movement of the frame are shown at 43''. The frame is reciprocated by means of a piston and cylinder 44, carried by the frame of the machine, the operation of which is controlled by a cam controlled valve 45.

As shown in Fig. 6, the piston rod 44' is provided with a screw threaded extension which extends through a guiding bracket 43a carried by the frame 43, and also through a yoke 43b carried by the frame of the machine. The rearwardly projecting end of this extension is provided with two stop nuts 44a and 44b. The nut 44a engages a bracket 43a carried by the frame 43 and therefore controls the extent of the forward movement of the frame, as the piston rod moves to the left in Fig. 6. The other nut 44b engages the yoke 43b and thereby limits the forward travel of the piston and rod 44'. The rearward movement of the frame 43 is occasioned by the shoulder formed on the rod 44' and its engagement with the bracket 43a. With this arrangement, the extent of the reciprocating motion of the frame 43 can be varied by varying the position of the nuts 44a and 44b; the nut 44a and the shoulder of the piston rod form, in effect, a lost motion connection between the piston rod and the frame 43. This in turn controls the extent of the movement of the pusher 14, and the stabilizer 47.

In order to prevent toppling of the articles engaged and moved by the pusher 14, the frame 43 is provided with the stabilizing plate 47, which is adapted to engage the upper ends of the articles, such as bottles, moved by the pusher 14. This plate is adjustably mounted on arms 47a which are pivotally secured to the frame 43 at 47b. Each of these arms is supported at a point intermediate its length by an adjustable support 47c, as shown in Figs. 4, 5 and 6. These supports are in the form of rollers carried by an adjustable yoke 48 and are held in position in a frame 49 by a screw threaded rod 48a and clamping nuts 48'. The rod extends through the top member of the frame 49. The arrangement is such that the stabilizing plate can be adjusted to different heights, depending upon the height of the articles being conveyed, and it reciprocates with the pusher 14. The plate is, however, raised when the pusher reaches the forward limit of its travel, for the purpose of moving it out of engagement with the articles moved by the pusher. This is accomplished by periodically lifting the frame 49 and consequently the rollers 47c and the arms 47a. This motion is accomplished by means of the strut 49', which is provided at its lower end with a roller 49a and at its upper end is provided with a yoke 49b, which engages the frame 49 and thereby lifts it as the strut is raised. The roller 49a rests on a cam 50, shown in Figs. 5 and 6 and is arranged to lift the roller at the proper time during the cycle of the machine.

In order to more effectively adjust the height of the stabilizer 47 above the conveyor 12 I prefer to have the pivot pins 47b of the arms 47a adjustable vertically along the uprights of the frame 43, which support these pins. This may be accomplished in any suitable way, such, for example, by providing a guiding slot in each of these uprights and mounting each pivot pin on a block 47e, which extends into the guiding slot of its supporting upright. Each block may be clamped in different positions along its co-operating slot as is customary in making such adjustments.

The stabilizer plate 47 is adjustable forwardly and rearwardly with relation to the pusher 14. As shown, it is carried by brackets 47d which are adjustably secured to the arm 47a, for example, by means of bolts. With this arrangement the member 47 may be moved forwardly or rearwardly, depending upon the shape of the upper ends of the articles engaged by the pusher 14.

In Figs. 4 and 5 I have shown an operating mechanism for the conveyor 12. As there shown, an electric motor 51 is coupled to a speed change gear 51a, which drives a sprocket chain 51b. The sprocket wheel 51c driven by this chain, is suitably geared to the sprocket 52 which, with the sprockets 52a and 52b guide a second sprocket chain 52c. The chain 52c drives the conveyor 12, which may be of any suitable form and, as shown, is driven by pulleys operatively coupled to the sprockets 52 and 52a. The sprocket 52b is merely an idler. The intermediate horizontal portion of the conveyor may be supported in any suitable manner, for example, by rollers similar to the roller 17'' shown in Fig. 7.

The sprocket 52a drives a sprocket 53, through the agency of suitable intermeshing gears, not shown but diagrammatically indicated. The chain 53a associated with this sprocket drives a timing shaft 54, shown in Figs. 4, 5 and 6. A drive sprocket 54a is shown in Figs. 4 and 6 but for convenience, the chain is omitted. This timing shaft carries the cam 50, a cam 55 and three cams 56, 57 and 58. The cam 55 is omitted in Figure 5 for convenience of illustration; it is however clearly shown in Figure 7.

The operation of the machine is as follows: The conveyor 10, moving in the direction of the arrows, shown in Figs. 1 and 2, receives articles at the end adjacent the standard 16. As these articles move with the conveyor they are engaged by the guides 23 and 23', which, as stated, are adjustable and are so arranged as to center the articles on the conveyor. The opening between the guides is in line with the open end of the trough 11 when the trough is in alignment with the belt 10. For this reason, the articles on the belt move through the guides and into the trough. The rear end of the trough forms a barrier and when engaged by an article on the belt, prevents further movement of that article. As a result the several articles moving along the conveyor are stopped by engagement with the rear end of the trough and by engagement with each other. This operation continues until the desired number of articles are held within the confines of the trough. In order to prevent more articles passing through the guides than can be received by the trough, the guide 23 is periodically moved toward the guide 23' so as to in effect close the opening between the guides and prevent the further movement of bottles therethrough. This movement of the guide 23 is a timed movement and is initiated by the cam 55, mounted on the timing shaft 54 and shown in Figs. 4, 6 and 7. The cam 55 actuates a cam rod 55a through the agency of a cam roller 55b. The rod is carried by suitable guides formed on the frame portion of the machine and is provided with a coacting spring 55c, which operates to press the roller 55b against the cam. A stop 55d is adjustably mounted on the rod and forms a spring seat for the spring. The rod 55a actuates a lever 59 which is fulcrumed at its upper end on a bracket 59a carried by the way 17. A link 59b forms a pivotal connection between this lever and the delivery end of the way 23. As shown in Fig. 3, the way or guide 23 is fulcrumed at 24' and therefore is capable of being swung toward and away from the way or guide 23' by the movements of the lever.

The timing shaft 54 also times the operation of the trough, the pusher and the stabilizer and the cam 55 is so formed and so located on that shaft that it moves the way 23 toward the way 23' prior to the swinging movement of the trough, but it retains the way in the open position a sufficient period to substantially fill the trough prior to each swinging movement.

As previously stated, this swinging movement of the trough is accomplished by the piston and cylinder 34 which is controlled by the cam actuated valve 36. As shown in Fig. 4, this valve is controlled by the cam 57 through the agency of roller 57a and cam rod 57b. The cam 57 is mounted on the timing shaft 54. The rod 57b is periodically moved longitudinally by the cam 57 and the valve is such that in one position of the rod it delivers motive fluid (air under pressure) to one end of the cylinder 34 and exhaust motive fluid from the other, whereas in another position of the rod motive fluid is delivered to and exhausted from the ports which previously formed the exhaust and inlet ports respectively of the cylinder 34. In this way the swinging movement of the trough 11 is accomplished in timed relation with the movement of the way 23 and also with the movement of the pusher 14.

As has been stated, the pusher 14 is actuated by the cylinder and piston 44. Motive fluid is delivered to and exhausted from the opposite ends of this piston in the manner described in connection with the piston and cylinder 34 and the flow of motive fluid to this cylinder is controlled by the valve 45 which, as shown in Fig. 4, is actuated by means of the cam 58, through the agency of cam roller 58a and cam rod 58b. The cam 58 is also mounted on the timing shaft 54.

The trough 11, in swinging from the belt 10 to the conveyor 12, moves the articles contained within it from the belt 10 across the plate 13 and on to the conveyor belt 12. It will be understood that when the articles on either conveyor are prevented from moving with the conveyor by coming in contact with any barrier, the conveyor slides under them and thus causes successive articles on the conveyor to contact with each other, and under such conditions, each article on the conveyor becomes a barrier for the article next behind it on the conveyor. The trough 11 in moving from the conveyor 10 to the conveyor 12 slides the articles across the asbestos plate 13. After this movement is accomplished the trough is, or may be lifted about the clevis pin 41 by the operation of the piston and cylinder 41'. As heretofore stated, the delivery of motive fluid to and from this cylinder is controlled by the valve 42 which, as shown in Fig. 4, is actuated by the cam 56, through the agency of the cam roller 56a and cam rod 56b. The timing of the movements of the way 23, the trough 11, the pusher 14 and the stabilizer 47 are all controlled from the timing shaft 54 and consequently the relative time of operation of each such mechanism may be varied by merely shifting the relative positions of its controlling cam on the cam shaft 54. It will, however, be noted that at, or shortly after the trough 11 or the gate 38 operates to release the articles then positioned on the belt 12, the pusher 14 and the stabilizer 47 should be in position to receive those articles. It will also be noted that the pusher 14 and the stabilizer form two guides for articles on the belt 12 and cooperate with the abutment 13' to hold those articles in alignment on the belt until such time as the pusher moves in delivering them to the leer, which will ordinarily be provided with a movable or conveyor bottom moving at right angles to the conveyor 12. It will also be apparent that the movement of the pusher can be so timed with relation to the lifting of the trough (or the opening of the gate) and the movement of the conveyor 12 that the articles released by the trough will be moved into engagement with the pusher before it moves forwardly, and that the rearward movement of the pusher will be accomplished after the stabilizer has been raised, but before additional articles have moved along the conveyor into its path of rearward travel across the conveyor. It will also be apparent that the position of the pusher along the conveyor may be adjusted for the purpose of feeding bottles into different parts of the leer. This may be accomplished in a number of ways. The pusher may be adjustable on the frame 43, the frame 43 may be adjustable to different positions along the conveyor belt or the pusher may be of considerable length and the barrier or abutment 13 may be adjustable to different positions along it.

As will appear from a study of the drawings and particularly from Figs. 1 and 6, the stabilizer plate 47 and its associated arms 47a are mounted on a horizontal plane substantially parallel with respect to the plane of the pusher 14, and are simultaneously movable with the frame 43 and the piston 44'. Since the pusher 14 and the stabilizer 47 both form a part of frame 43, the movement of the stabilizer and of the pusher will be along planes which are substantially parallel with respect to each other, and thus, with respect to the conveyor 12. If it is desirable to simultaneously or at timed intervals raise the stabilizer 47 about its pivot point 47b, this is accomplished by means of the vertical frame 47 and the cam mechanism 49a—50.

In Fig. 4 each of the cam rollers 56a, 57a and 58a is shown as spring pressed against its respective cam. For this reason one movement of each associated cam rod may be said to be in response to spring pressure, but I wish to state that my invention contemplates any method of operating the various parts of the machine in timed relation, and it will be apparent that various changes, additions and omissions may be made to the apparatus illustrated without departing from the spirit and scope of my invention as defined by the appended claims.

What I claim is:

1. In a transfer device for glass articles which is located between article delivery means and article receiving means, a transfer mechanism movable from a cooperating position with respect to one of said means to a cooperating position with respect to the other of said means, said transfer mechanism including a transfer trough and movable means for closing an end of said trough during such movement.

2. In a transfer device for glass articles which is located adjacent an article delivery means and an article receiving means, a transfer mechanism movable from a cooperating relationship with respect to one of said means to a cooperating relationship with respect to the other of said means, said transfer mechanism including a transfer trough and movable means for closing an end of said trough during movement along a plane between said delivery means and said receiving means.

3. A transfer device located between two conveyors extending at an angle to each other, comprising a stationary platform located between said conveyors, a pivotally mounted arm movable from a position in substantial alignment with one conveyor across said platform to substantial alignment with the other conveyor to transfer articles from one conveyor to the other, and movable means extending across the free end of said arm during the movement of said arm across said platform.

4. A transfer device located between two conveyors extending at an angle to each other, comprising a stationary platform located between said conveyors, an open bottom trough open at one end and movable from a position in substantial alignment with one of said conveyors across said platform into substantial alignment with the other, and movable means for closing the open end of said trough during its movement across said platform.

5. A transfer device located between two conveyors extending at an angle to each other, comprising a stationary article support located between such conveyors, an open bottom trough movable from a position in substantial alignment with one such conveyor across said support to a position in substantial alignment with the other conveyor, and a movable gate for closing the end of said trough as said trough moves across said support.

6. In combination with a conveyor, a transfer mechanism for receiving articles on said conveyor, and comprising spaced guides mounted to swing from a position in alignment with said conveyor to a position at an angle thereto, guides extending along said conveyor, means for periodically actuating at least one of said last mentioned guides to block the movement of articles on the conveyor toward said transfer mechanism, and means operating in timed relation with said periodically actuating means for swinging said transfer mechanism.

7. A transfer device located between two conveyors extending at an angle to each other, comprising a stationary platform located in the angle between such conveyors, a trough pivoted at the point of intersection of such conveyors and movable around its pivot point and across said platform from a position in line with one conveyor to a position in line with the other conveyor, and means operating in timed relation with movements of the trough for periodically checking the movement of articles on one of said conveyors while holding them in aligned relation.

8. A transfer device located between two conveyors extending at an angle to each other, comprising a platform located in the angle between such conveyors, a trough movable across said platform from a position in substantial alignment with one of said conveyors to a similar position with relation to the other, means operating in timed relation with the movements of the trough for lifting the trough after it is in alignment with one conveyor, and means operating in timed relation with the movements of the trough for checking the movement of articles on the other conveyor.

9. In a machine of the character described, two conveyors, a transfer mechanism adapted to receive articles on one conveyor and to deliver such articles to the other conveyor, means for moving said mechanism from one conveyor to the other, a gate for confining articles within said transfer mechanism, and means actuated by the motion of said mechanism for actuating said gate.

10. A transfer device located between two conveyors, comprising means movable from a position in substantial alignment with one conveyor to a position in substantial alignment with the other conveyor, to receive articles from one and to deliver them to the other conveyor, a gate for closing the end of said means during movement thereof, and means for opening said gate as it moves to an article receiving position with relation to one conveyor.

11. A transfer device located between two conveyors extending at an angle to each other, comprising means pivoted adjacent the line of intersection of said conveyors and movable from a position in substantial alignment with one conveyor to a position in substantial alignment with the other conveyor to receive articles from one and deliver them to the other conveyor, a gate for closing the end of said means during movement thereof, and means for opening said gate as said means moves to an article receiving position with relation to one conveyor.

12. A transfer device located between two conveyors extending at an angle to each other, comprising a platform located between such conveyors, a trough movable back and forth across said platform from a position in alignment with one conveyor to a position in alignment with the other conveyor, means operating in timed relation with movements of the trough for alternately checking the movement of articles on one conveyor and releasing such articles to move into said trough, a gate carried by the trough and means for closing said gate as said trough moves to deliver articles from one conveyor to the other.

13. In combination with two conveyors and the leer charger of a leer packing device, a platform located between such conveyors, a swinging trough for moving articles from one such conveyor across said platform to the other conveyor in the operation of delivering such articles to the charger, means operating in timed relation with the movements of the charger for swinging the trough from an article receiving position with relation to one such conveyor to an article delivering position with relation to the other conveyor, means operating in timed relation with the trough operating means for assembling and aligning articles on one such conveyor while said trough is out of alignment therewith and for releasing such articles to move into said trough when the trough is in alignment with such conveyor, a gate closing the end of said trough and means responsive to the movement of the trough for opening said gate to receive such aligned articles.

14. A transfer device located between two conveyors, comprising means movable from a position in substantial alignment with one conveyor to a position in substantial alignment with the other to deliver articles from one to the other conveyor, a spring closed gate for said means, and a stop for opening said gate as said means moves into substantial alignment with one conveyor.

15. A transfer device located between two conveyors, comprising means movable from a position in substantial alignment with one conveyor to a position in substantial alignment with the other to deliver articles from one to the other conveyor, a gate for closing said means during such motion, and means for lifting said means to deliver articles therefrom.

16. A transfer device located between two conveyors extending at an angle to each other and comprising a stationary platform located within the angle between the conveyors, a pivotally mounted arm movable from a position in substantial alignment with one conveyor, across said platform and into substantial alignment with the other conveyor, and means carried by said arm and movable with relation thereto to hold articles in position relatively to said arm during the movement of the arm, and means for tilting said arm.

17. In a machine of the character described, two conveyors operating at an angle to each other, a transfer mechanism adapted to receive articles on one conveyor and to deliver such articles to the other conveyor, means for swinging said mechanism from one conveyor to the other, means pivotally supporting said transfer mechanism at one end thereof, and means operating in timed relation with said first mentioned means for angularly elevating said transfer mechanism about said pivot supporting means after it has moved into position with relation to one conveyor.

18. A transfer device located between at least two conveyors which includes a transfer trough movable from a position in substantial alignment with one such conveyor to a position in substantial alignment with the other conveyor, and means for normally closing an end of said trough, and means associated with at least one of said conveyors for opening said closing means when said transfer mechanism has moved to substantial alignment with said last-mentioned conveyor.

19. A transfer mechanism located between two conveyors extending at an angle with respect to each other which includes a pivotally mounted trough movable from a position in substantial alignment with one of said conveyors to a position in substantial alignment with another of said conveyors, and a resiliently-positioned gate for normally closing the end of said trough as said trough moves from one conveyor to another, and contact means associated with at least one of said conveyors for compressing said resilient gate and opening it when said transfer means is in substantial alignment with one of said conveyors.

20. In a machine of the character described, at least two conveyors operating at an angle with respect to each other, oppositely positioned conveyor guides pivotally mounted on one of said conveyors, a transfer mechanism pivotally mounted on said last-mentioned conveyor and having an end adapted to cooperate with an end of said conveyor guides for receiving articles therefrom, a stationary article support extending between said conveyors, means for moving said transfer mechanism across said article support from a position in substantial alignment with one of said conveyors to a position in substantial alignment with another of said conveyors, and means timed to the swing of said transfer mechanism for closing a discharge end of said conveyor guides until said transfer mechanism returns to a cooperative position with respect to said guides, a pusher means mounted adjacent the second or receiving conveyor, and means for moving said pusher transversely of said conveyor for discharging articles therefrom, a stabilizer plate mounted above said pusher and adapted to cooperate with and support the sides of ware, and means for raising said stabilizer plate prior to an operation of said pusher means, and a plurality of timing mechanisms cooperatively timing the operation of said conveyor guides, said transfer mechanism, said pusher, and said stabilizer plate.

21. In a transfer device located between a plurality of conveyors, a transfer mechanism movable from a cooperating relationship with respect to one carrier to a cooperating relationship with respect to another carrier, means for closing off said transfer mechanism during such movement, and means mounted adjacent one of said carriers for opening said first-mentioned means when said transfer mechanism is moved to a cooperating relationship with respect to the said one of said conveyors, and additional means for opening said first-mentioned means when said transfer mechanism is moved to a cooperating relationship with respect to another of said conveyors.

22. In combination with a conveyor, a pusher mounted in a cooperating relationship therewith for moving articles with respect thereto, a stabilizer also mounted in a cooperating relationship with respect to the conveyor, a frame for movably supporting said pusher and said stabilizer with respect to the conveyor, means pivotally mounting said stabilizer at one end thereof upon said movable frame, and means cooperating with a portion of said stabilizer located between said pivot means and the article stabilizing end of said stabilizer for moving said stabilizer about said pivot point.

23. In combination with a conveyor, a pusher mounted in a cooperating relationship therewith for moving articles with respect thereto, a stabilizer also mounted in a cooperating relationship with respect to the conveyor, a frame for supporting said pusher and said stabilizer, means pivotally mounting an extending end of said stabilizer on said movable frame, piston means connected by a lost-motion mechanism to said frame for moving it, and a cam actuated frame for moving said stabilizer about said pivot means.

JOHN W. HARDING.